United States Patent
Kim et al.

(10) Patent No.: US 8,767,635 B2
(45) Date of Patent: *Jul. 1, 2014

(54) METHOD OF SCHEDULING SHARED CHANNELS AND A SCHEDULER THEREFOR IN A WIRELESS PACKET COMMUNICATION SYSTEM

(75) Inventors: Ki Jun Kim, Seoul (KR); Young Jo Lee, Kunpo-shi (KR); Young Woo Yun, Seoul (KR); Suk Hyon Yoon, Seoul (KR); Soon Yil Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 800 days.

This patent is subject to a terminal disclaimer.

(21) Appl. No.: 12/631,973

(22) Filed: Dec. 7, 2009

(65) Prior Publication Data
US 2010/0085932 A1    Apr. 8, 2010

Related U.S. Application Data

(63) Continuation of application No. 11/808,993, filed on Jun. 14, 2007, now Pat. No. 7,653,025, which is a continuation of application No. 10/189,629, filed on Jul. 8, 2002, now Pat. No. 7,245,595.

(30) Foreign Application Priority Data

Jul. 10, 2001 (KR) ................... P2001-41362

(51) Int. Cl.
| | | |
|---|---|---|
| *G01R 31/08* | (2006.01) | |
| *H04H 20/71* | (2008.01) | |
| *H04W 4/00* | (2009.01) | |
| *H04J 3/00* | (2006.01) | |
| *H04B 7/00* | (2006.01) | |
| *H04B 7/14* | (2006.01) | |
| *H04W 72/00* | (2009.01) | |
| *H04W 36/00* | (2009.01) | |

(52) U.S. Cl.
USPC ........... 370/329; 370/312; 370/328; 370/336; 370/252; 370/242; 455/509; 455/9; 455/450; 455/438

(58) Field of Classification Search
USPC ................ 370/329, 312, 328, 336, 252, 242; 455/509, 422, 450, 9, 438
See application file for complete search history.

(56) References Cited

U.S. PATENT DOCUMENTS

| | | | |
|---|---|---|---|
| 5,729,542 | A | 3/1998 | Dupont |
| 6,091,717 | A | 7/2000 | Honkasalo et al. |
| 6,393,008 | B1 | 5/2002 | Cheng et al. |
| 6,920,119 | B2 * | 7/2005 | Rinchiuso ............ 370/329 |

(Continued)

FOREIGN PATENT DOCUMENTS

| | | |
|---|---|---|
| CN | 1147736 | 4/1997 |
| EP | 877512 | 11/1998 |
| KR | 10-1998-0086755 | 12/1998 |

*Primary Examiner* — Brandon Renner
*Assistant Examiner* — Abdelnabi Musa
(74) *Attorney, Agent, or Firm* — Lee, Hong, Degerman, Kang & Waimey

(57) ABSTRACT

The present invention relates to a method of scheduling a shared channel of a wireless packet communication system, and more particularly, to a shared scheduler of a wireless packet communication. The present invention includes determining priorities of provided services for target terminals of cellular phones and ratios of carrier signal to interference from multiple target terminals; and based on the determined priorities, transmitting packet data to each the target terminal of cellular phones.

4 Claims, 1 Drawing Sheet

(56) References Cited

U.S. PATENT DOCUMENTS 7,042,856 B2 5/2006 Walton et al.
2002/0141362 A1 10/2002 Hsu et al.
2004/0013102 A1* 1/2004 Fong et al. .................. 370/345
2005/0078628 A1 4/2005 Suzuki et al.

* cited by examiner

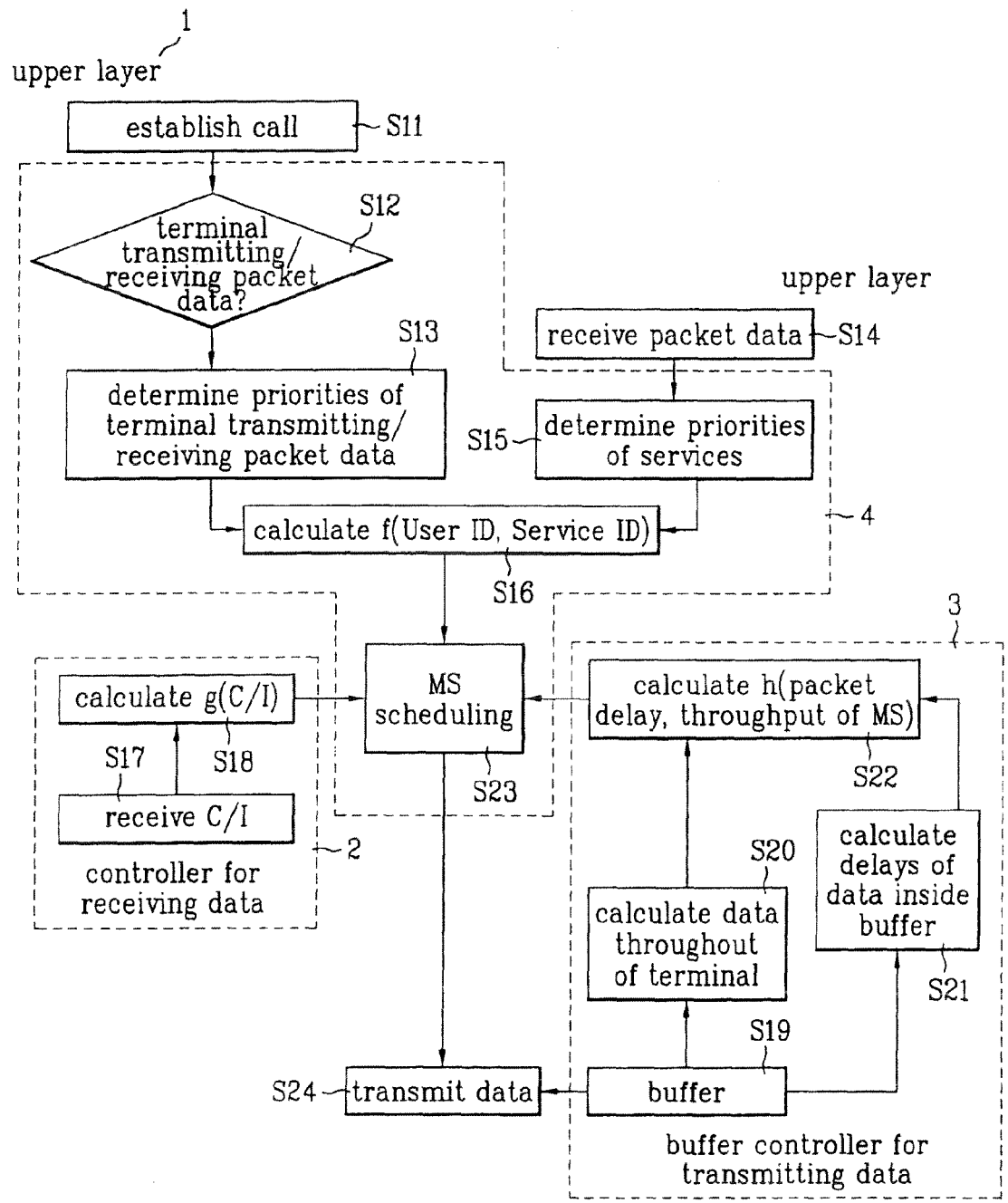

METHOD OF SCHEDULING SHARED CHANNELS AND A SCHEDULER THEREFOR IN A WIRELESS PACKET COMMUNICATION SYSTEM

CROSS-REFERENCE TO RELATED APPLICATIONS

This application is a Continuation of U.S. patent application Ser. No. 11/808,993, filed Jun. 14, 2007, now U.S. Pat. No. 7,653,025, which is a Continuation of U.S. patent application Ser. No. 10/189,629, filed Jul. 8, 2002, now U.S. Pat. No. 7,245,595, which claims the benefit of earlier filing date and right of priority to Korean Application No. P2001-41362 filed on Jul. 10, 2001, the contents of which are all hereby incorporated by reference herein in their entirety.

BACKGROUND OF THE INVENTION

1. Field of the Invention

The present invention relates to a method of scheduling a shared channel of a wireless packet communication system, and more particularly, to a shared scheduler of a wireless packet communication.

2. Discussion of the Related Art

In a current 1xCDMA system, it is designed to support voice services of a circuit switched mode and low data services. As the demand of wireless Internet services has been increased, a new communication tool for only high-data packet, called HDR (High Data Rate) or 1x-EV DO (1x-Evolution Data Only), was suggested. This HDR or 1 xEV-DO is specifically designed for high speed packet data service other than voice service and offers a bandwidth efficiency for data traffic that is 3 to 4 times greater than the current 1xCDMA system. This technology is ideal for high-speed mobile as well as Fixed wireless Internet services.

Besides, there exists another new air interface technology is called 1x-EV-DV (1x-Evolution Data and Voice) evolved from 1x-EV DO. The 1x-EV-DV is capable of providing both high-rate packet data service and voice services of circuit switched mode at the same time. Moreover the 1x-EV-DV put forward a system whose voice modes are fully compatible with the current 1xCDMA voice modes, and shared channel services such as 1x-EV-DO for enhanced data services. In order for the compatibilities of the current 1xCDMA2000, the 1x-EV-DV, reusing all common channels from CDMA 2000, supports Radio Configuration (hereafter referred to RC). In addition, it is also composed of shared-channels for packet data services as independent RC formats.

In case of existing voice service user and data service user using the circuit switched mode, the 1x-EV-DV system dynamically allocates the remaining power and walsh code for Forward Packet Data Channel and the 1x-EV-DV system increases data throughputs of a base station by allocating the remaining power from the base station and walsh codes to the prioritized users (terminals or handsets of cellular) who's had a better link channel quality from the base station to users. However the base station does not know what the forward link channel quality is to an individual user without feedback information from the user. Once the feedback system is set up, the user (the terminal of cellular) transmits data to let the base station know about the link channel quality. And based on the feedback information, it requires to schedule a sequence of data to be transmitted to the target terminals for prioritized users. In this case it is necessary to select an appropriate method of a modulation and polarizations of the channels for the feedback system successfully to transmit such an information containing the link channel quality, which is called transmitting scheduling.

Hereinbelow, a method of measuring the quality of a forward link channel is described. Assuming that the terminal measured values of C/I (ratio of carrier signal to interference) in a common pilot, the measured values become quantized and sent back to the base station through reverse link channels. That is, by the above method, the terminal itself can select the base station or sectors which has the best link channel quality. Once the selection is done, values of the link channel quality selected by the terminal are transmitted to the selected base station or sector.

In other words, the terminal selects which base station has the best channel quality and then let the selected base station know what the best channel quality. This process is done through RCQICH (Reverse Common Quality Indicator Channel) to transmit the information back to the base station or sector. Therefore only a base station received the information of the link channel quality knows which terminal is selected. Then the base station starts to transmit data based on the received information of the link channel quality.

In the 1x-EV-DV system, multiple terminals transmit data through one shared-channel without causing any jam in data processing. In order to do that, it requires an algorithm to share resources with the multiple terminals. By this algorithm, the shared-channel is allocated to each terminal out of the multiples. Which is done efficiently by a role of a scheduler.

The primary role of the scheduler is to increase the system throughput and simultaneously allocate the resources to each terminal properly. In general to maximize the system throughput, the most resources are allocated to the terminals having maximum values of C/I (ratio of carrier signal to interference). However a problem comes up when the above algorithm is implemented. What the problem is that few terminals having higher values of C/I monopolize all the resources, which results in the majority of target terminals losing all the link abilities.

To overcome this hindrance, the chance of transmitting data could be equally given to all the multiple target terminals. But unfortunately it causes another problem such as worsening the system throughput efficiency, even though solving the problem of abandoning the majority of target terminals. Eventually it is necessary to implement an alternative algorithm which can trade off between the system throughput efficiency and the resource allocation to selected terminals.

Assuming the current HDR system being implemented, the scheduling algorithm is known to meet the following equation below:

$$P(k)=DRC(k)/\text{Throughput for } k\_th\,MS \qquad (1)$$

Wherein DRC(k) is the data rate of k_th ordinal number of the terminal, Throughput for K_th MS is the throughput of k_th terminal to the base station, and P(k) is priority function to prioritize k_th ordinal number of the terminal.

According to the equation (1), the terminal having the maximum value of the priority function receive the allocation of time slots and then starts to transmit packet data to the base station. This is called a proportional fair scheduler.

By considering the 1x-EV-DV system, the information of channel conditions transmitted by the terminals is formatted as the ratio of signal carrier to interference (C/I). Compared to HDR that transmitting, data rate is selected by the terminal itself, the base station of 1x-EV-DV system receives C/I transmitted from the terminals. Then based on the C/I indicating the channel conditions, the base station selects the transmitting data rate other than the terminals.

According to the 1x-EV-DO using C/I to indicate the channel conditions, two terminals having 4 dB and 7 dB of C/I, for example, should have different link availabilities. Even though these two terminals receive the same transmitting data rates, the terminal having 7 dB for C/I evidently have lower error rate of transmitted packets than the other with 4 dB. Consequently regardless of equal transmitting data rates, the scheduler must allocate more time slots to the terminal having higher values of C/I in order to increase the system throughput efficiency. Since the PF scheduler gives the equal priorities on the terminals having same transmitting data rates, it makes a worse as far as the system throughput efficiency is concerned Furthermore the PF scheduler is not able to prioritize the individual terminal grade and provided service type at all. For instance, it is desirable for a terminal requiring real-time services, such as image data, to have a higher priority to transmit data packets than others for better link services. Unfortunately the PF scheduler is unable to meet this prioritized services and even could not guarantee the link channel quality due to the fact that the PF scheduler does not recognize which service such as FTP or real-time service has higher priorities terminal.

SUMMARY OF THE INVENTION

Accordingly, the present invention is directed to an apparatus of a shared scheduler and a method of scheduling a shared channel of a wireless packet communication system that substantially obviates one or more problems due to limitations and disadvantages of the related art.

An object of the present invention is to provide a flexible wireless data packet service and increase a throughput of a wireless packet communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In an aspect of the present invention, a method of scheduling shared-channels in a wireless packet communication system comprises the steps of determining a priority according to a service type, a terminal grade and ratio of carrier signal to interference from the terminals respectively, and transmitting packet data to each terminal based on the determined priority through at least one shared channel.

preferably, further comprises determining a higher priority further based on a transmission delay and a throughput of packets on each terminal.

Preferably, the higher priority is determined by individually allocating weights to the ratio of carrier signal to interference, the terminal grade and the service type, and one of the transmission delay and the throughputs of the packets.

In other aspect of the present invention, a shared-scheduler in a radio packet communication system comprises a scheduler for determining a priority according to a service type, a terminal grade and a ratio of carrier signal to interference from a plurality of terminals respectively, and a transmission means for transmitting packet data to each terminal based on the determined priority.

Preferably, the scheduler determines higher priority further based on a transmission delay and a throughput of packets of each terminal.

Preferably, the scheduler determines the higher priority by respectively allocating weight values to the ratio carrier signal to interference (C/I), priorities of the terminal grade, the service type, and one of the transmission delay and the throughput of the packet.

In another aspect of the present invention, a method of scheduling a shared-channel in a wireless packet communication system comprises the steps of determining a first priority factor by a service type and a grade of terminal which is connected a call, determining a second priority factor by a ratio of carrier signal to interference, determining a third priority factor by allocated time slots of each terminal, determining a priority by the first priority factor, the second priority Factor, third priority factor and weigh values, and transmitting packet data based on the priority through at least one shared channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a flow chart of a shared scheduler of a wireless packet communication system.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Referring to FIG. 1, the present invention suggests a method of prioritize provided services to target terminals based on the ratio of carrier signal to interference from a reverse link. The definition of a priority function of the scheduler can be obtained from the equation below:

$$P(k) = alpha*f(MS\ ID, service\ ID) + beta*g(C/I) + gamma*h(packet\ delay, throughput\ of\ the\ MS) \quad (2)$$

Wherein f(MD ID, service ID) is characterized by various provided services to target terminals, g(C/I) is functioned by C/I transmitted from the terminals, and h(packet delay, throughput of the MS) is functioned by time slot allocated to each terminal.

From the equation (2), the faster data rate and the better throughput of the target terminal get more time slot allocations. And also more delays of buffer occur in the base station, more time slot allocations receive. The coefficient alpha tells which terminal or which provided service type has higher priority than others. The coefficient beta tells C/I indicating the link channel conditions. And the coefficient gamma tells the packet delay time and the system throughput of each terminal. The details of each parameter and the definition of the functions must be explored to get better understanding of this present invention, which are the following.

As described in FIG. 1, the procedure of prioritizing the terminals to transmit and receiving packet data is done as follows. First, an arbitrary target terminal is made a call to an upper layer 1 of the base station, known as establishing a call S11 (link set-up). Once a call is established, a scheduler 4 receives the information of the target terminals grade, by MS ID from the upper layer. Then the scheduler chooses which terminals, having links to the base station, are eligible to transmit or receive packet data more effectively S12. After the selections done, the scheduler takes the final step S13 to prioritize the target terminals to transmit and receive packet data thorough the shared channel.

Under the circumstance of establishing a call link as described above, if the packet data are given from the upper layer, the scheduler 4 receive the information of what kind of services these received packet data support. In other words, these received packet data are analyzed and categorized as what services are supported on each packet data S15. Once all the received packet data are identified as categories of what kind of service they support, then the services as well by the process S15 get prioritized by the scheduler. Then by reviewing prioritized services correlated to the MS ID and the service ID, the function f(MS ID, service ID) is defined and the coefficient alpha is calculated. This function in the equation (2) plays a role in supporting multi-categorized service qualities. What that means is that what the service costs and the service requests decide priorities of the service qualities based on MS ID and service ID. Therefore, by this term in the equation (2), the service costs and requests are one of the parameters for the scheduler to decide the priorities of link-service qualities. That is a role of the coefficient alpha and the function f(MS ID, Service ID).

The second coefficient beta can be calculated as follows. In FIG. 1, a receiver data control 2 is to receive the information of the channel quality through C/I, which is S 17 in the FIGURE. In order to increase the system throughput and select the target terminals having better C/I, the function g(C/I) is introduced in the equation (2). And also by taking the coefficient beta on the function g(C/I), the link conditions of the target terminals and the system throughput linearly affect the scheduler to provide a shared-channel to the multi-target terminals.

The third coefficient gamma is to keep a fairness regarding the resource allocation of each target terminal. Considering S 21 in the FIG. 1, the scheduler always calculates delays of arrived packet data from the time of being stored in the buffer to the next transmission. Besides in this process, the throughput of the target terminal (How much information is being transmitted to the base station so far) is also determined by how much data transmitted from the buffers S20. Therefore according to the above step S 20, the function h(packet delay, MS throughput) is defined by calculated the delay of transmitting packet data and data throughput of the terminals. By adding this coefficient gamma, the resource allocation can be uniformly distributed to the target terminals based on these parameters. In the FIG. 1, the step S 23 is determine all the coefficients by the scheduler and take these coefficients on the corresponding defined functions. In the following step S 24, the packet data are transmitted in such a pattern by the results of the above scheduling.

It will be more clear that what these coefficients affect the scheduler by \raring alpha, beta, and gamma in the equation (2). Hereinbelow there are several examples of each different coefficients and the comparisons to the conventional schedulers. Surprisingly all the conventional scheduling methods of wireless packet data systems we discussed are nothing but special cases of the scheduler by this present invention. If MS ID, for example, is equal to service ID, h(packet delay, MS throughput) is just MS throughput, and beta is equal to gamma, then the equation (2) is simplified to the one for the conventional PF scheduler. By looking at the equation (2), the system throughput can be maximized by increasing the value of beta. And in the case of gamma having larger value, the entire users get almost the equal time slot allocation to keep the fairness among the target terminals (users) having no correlation with the system throughput. Eventually these coefficients are in charge of placing more weights on the corresponding functions such as f, g, and h based on the link channel conditions.

From now it is more understood to redefine and summarize each coefficient having relationships with real wireless packet data link conditions. The first coefficient alpha is to place a weight on prioritized services for varieties of billing systems and multi-service qualities. The main purpose of this coefficient is to provide prioritized target terminals and service qualities as needs of billing services and the requests of service providers. The second coefficient beta is to place a weight on the system throughput as a role of earning profits for the service providers. And finally the third coefficient gamma is to place a weight on preventing lowering the service qualities due to over-exceed service requests.

By adjusting these three coefficients, the service provider is able to place an importance on each prioritized terms depending on real link availabilities. So this present invention gives a rise to the flexibility of operating systems, providing the various requested services as what they need by adjusting the prioritized terminals and services, and eventually providing graded services per each terminal.

As described above, the features of a scheduler by the present invention are summarized as follows. First of all, since the priorities of target terminals and services are provided, the operation of the wireless packet data communication systems becomes more flexible on the resource allocations for the target terminals. In addition, by the requests of the service providers and cellular phone users, various service qualities can be provided as various formats. Secondly, unlike the conventional HDR, the ratio of signal carrier to interference instead of transmission data rates is used so that the overall error rates of transmit packets decrease and the system throughput can increase. Thirdly since packet delays and terminal throughputs are taken into account, it results in maintaining good stable service qualities.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of scheduling a common downlink channel in a wireless communication system, the method comprising;
   receiving packet data and an identifier (ID) of a user from an upper layer at a base station, the packet data comprising information representing a service identifier (ID) identifying a service with which the received packet data is associated;
   determining a first priority based on types of the user and the service using the user identifier (ID) and the service identifier (ID);
   determining a second priority based on a channel status using a ratio of carrier signal to interference (C/I) received from the user;

determining a third priority based on a transmission delay and a data throughput of the user to which the packet data is to be transmitted;

scheduling transmission of the packet data based upon a sum of the first, second, and third priorities to which variable weights are added, respectively;

transmitting the packet data to a mobile terminal using scheduling of the common downlink channel allocated to the service identifier (ID); and updating the scheduling of the transmission of the packet data pertaining to the service identified by the service identifier (ID).

2. The method of claim 1, further comprising buffering the received packet data in a buffer associated with the service identified by the obtained service identifier (ID).

3. A base station for scheduling a common downlink channel in a wireless communication system, the base station comprising:

a memory; and a controller operatively coupled to the memory and being configured to:

receive packet data and an identifier (ID) of a user from an upper layer, wherein the packet data comprises information representing a service identifier (ID) identifying a service with which the received packet data is associated;

determine a first priority based on types of the user and the service using the user identifier (ID) and the service identifier (ID);

determine a second priority based on a channel status using a ratio of carrier signal to interference (C/I) received from the user;

determine a third priority based on a transmission delay and a data throughput of the user to which the packet data is to be transmitted;

schedule transmission of the packet data based upon a sum of the first, second, and third priorities to which variable weights are added, respectively;

transmit the packet data to a mobile terminal using scheduling of the common downlink channel allocated to the service identifier (ID); and update the scheduling of the transmission of the packet data pertaining to the service identified by the service identifier (ID).

4. The base station of claim 3, wherein the controller is further configured to perform buffering on the received packet data in a buffer associated with the service identified by the obtained service identifier (ID).

* * * * *